United States Patent [19]
St. Clair

[11] 4,406,391
[45] Sep. 27, 1983

[54] SYSTEM FOR ACCUMULATING AND HANDLING STRIPS OF POCKETED SPRINGS

[76] Inventor: Albert R. St. Clair, 952 Guys Ct., Lilburn, Ga. 30247

[21] Appl. No.: 369,321

[22] Filed: Apr. 16, 1982

[51] Int. Cl.³ .................... B65H 17/42; B65H 17/50
[52] U.S. Cl. .............................. 226/118; 140/3 CA; 226/104
[58] Field of Search ............... 226/43, 88, 104, 105, 226/113, 118, 119; 140/3 CA, 71 C, 89, 110, 124; 5/477–480; 68/13 R; 414/736

[56] References Cited

U.S. PATENT DOCUMENTS

| | | | |
|---|---|---|---|
| 2,804,299 | 8/1957 | Robertson | 226/118 |
| 3,353,730 | 11/1967 | Lang | 226/43 |
| 3,441,064 | 4/1969 | Fischer et al. | 140/3 CA |
| 3,469,608 | 9/1969 | Kirchner et al. | 140/3 CA |
| 3,918,473 | 11/1975 | Ramsey | 140/3 CA |
| 4,162,732 | 7/1979 | Redman | 414/736 |
| 4,238,938 | 12/1980 | Spear | 68/13 R |

*Primary Examiner*—Leonard D. Christian

[57] ABSTRACT

A system is provided for handling a strip of pocketed coil springs in an organized manner. An accumulator bin receives the strip from a conveyor assembly which oscillates about a pivot axis to feed the strip evenly across the width of the bin. The bin is designed to urge the first manufactured portions of the strip to the front portion thereof where it may be removed by a second conveyor assembly. Photosensitive devices may be provided to control the feeding of the strip to the bin and its removal therefrom.

20 Claims, 10 Drawing Figures

SYSTEM FOR ACCUMULATING AND HANDLING STRIPS OF POCKETED SPRINGS

BACKGROUND OF THE INVENTION

1. Field of the Invention

The field of the invention relates to a materials handling system, and particularly to a system for handling strips of pocketed spring coils.

2. Brief Description of the Prior Art

Pocketed spring coils have been used for upholstery purposes for a number of years. They are typically manufactured in strips wherein the axes of the respective coils are parallel to each other. The individual pockets have traditionally been formed by a stitching process, but more recently thermal welding has been employed where the pocket material has the necessary properties for allowing it. U.S. Pat. No. 4,234,983 is directed to a strip of pocketed coils wherein the coils are separated by a series of thermal welds. An assembly of suchs strips as part of a mattress is disclosed in U.S. Pat. No. 4,234,984.

When strips of pocketed coils emerge from an apparatus for manufacturing them, they traditionally have not been organized in any particular manner which would facilitate their subsequent handling. In other words, the strips have been allowed to accumulate into a substantially unorganized pile that is often difficult to handle when they are to be processed into structure suitable for upholstery.

SUMMARY OF THE INVENTION

A system is provided by the invention for handling strips of pocketed spring coils in an orderly manner after they emerge from a fabricating apparatus.

An accumulator bin of suitable configuration is provided for receiving a strip from the fabricating apparatus. An infeed conveyor feeds the strip into the bin. The conveyor may be actuated upon a signal from a photosensitive device mounted between the fabricating apparatus and the conveyor. A loop is formed by the strip between the two structures. When the loop exceeds a certain size due to the production of additional pocketed coils, the photosensitive device detects the loop and causes the actuation of the infeed conveyor to reduce its size.

In order to distribute coils evenly within the bin, the conveyor and/or a chute extending therefrom is mounted for oscillation about a substantially vertical axis. This insures that all of the bin will be used to advantage.

The bin includes an inclined surface which terminates in an upwardly extending arcuate portion. The strip is fed onto the inclined surface and works its way slowly to the arcuate portion. As additional pocketed coils are fed, the strip is pushed down the incline and up the arcuate portion. In this manner, the first manufactured pockets are always towards the front of the bin. The possibility of tangling the strip upon removal from the bin is greatly reduced in comparison with previous methods which allowed the strip to simply pile up on a pallet or the like.

An outfeed conveyor is provided for removing the strip from the bin. A second photosensitive detector is provided for sensing the size of a loop formed by the strip as it exits the outfeed conveyor. If the loop decreases in size as the pocketed coils are assembled or otherwise processed, the outfeed conveyor will be actuated to insure there are a sufficient number of coils at all times. The assembling operation may be conducted as described in U.S. Pat. No. 2,805,429 to Woller or in any other manual, semi-automatic, or automatic fashion.

DETAILED DESCRIPTION OF THE INVENTION

Figure 1:
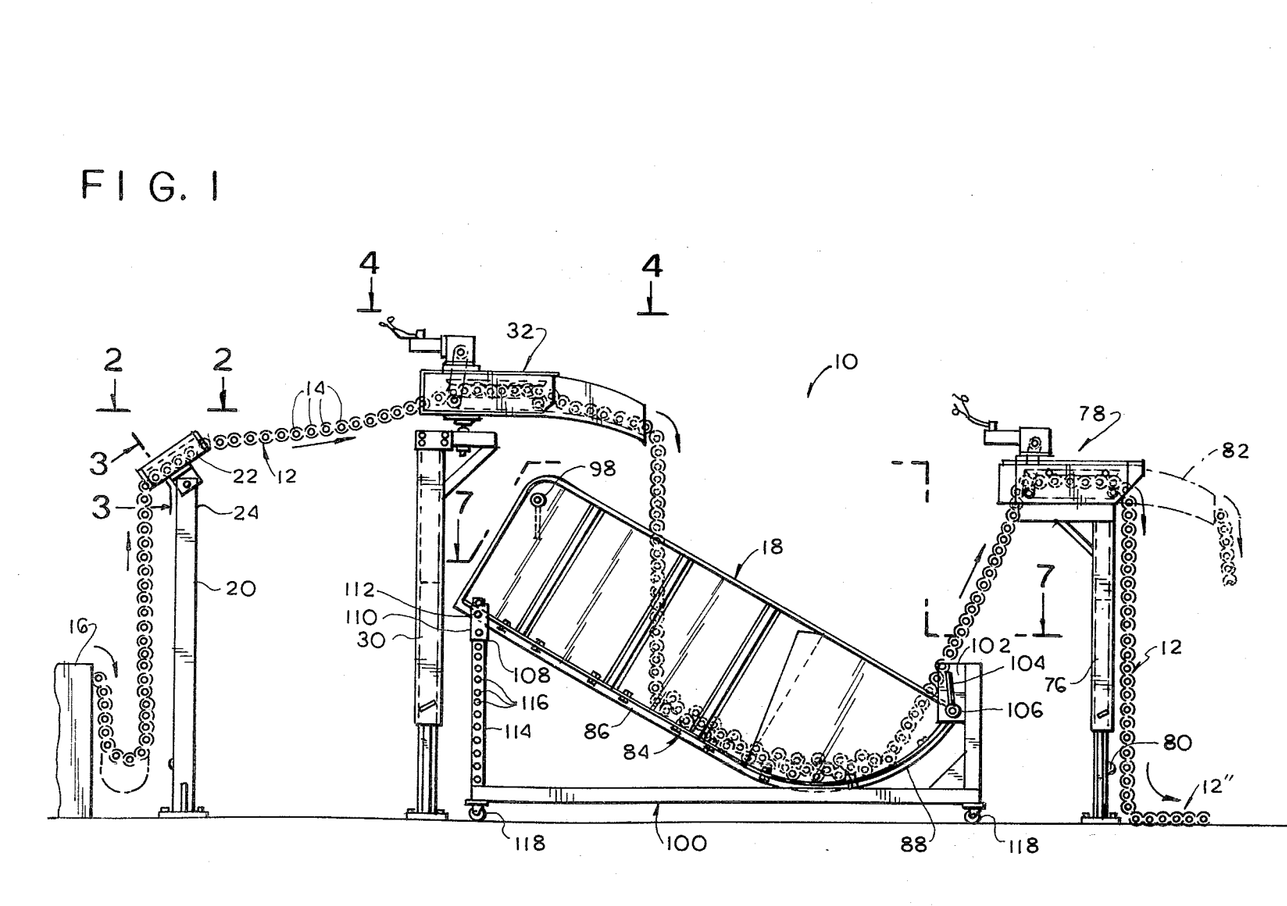
FIG. 1 is a side elevation view of a system according to the invention.

A system 10 for handling a strip 12 of pocketed spring coils 14 from their point of manufacture to the station at which they are assembled into a desired configuration is provided. The pocketed coils may be constructed as shown in U.S. Pat. No. 4,234,983. The pocket material is thermally weldable to facilitate the manufacturing of the strips 12. An apparatus 16 is provided for inserting coil springs between layers of pocket material and then making the appropriate welds to complete the pocketed coil strips.

After the strip 12 emerges from the manufacturing apparatus 16, it is temporarily stored in an accumulator bin 18. Since it is desirable to provide room for one to walk behind the bin 18 without becoming tangled with the strip 12 and possibly damaging it, a column 20 having a guide chute 22 positioned thereon is employed. The chute 22 is pivotably mounted to the column by means of a bolt 24 and may be adjusted to a desired angle of inclination. Sufficient clearance behind the bin is accordingly provided. This is important in a system including a plurality of manufacturing apparatus and accumulator bins arranged in parallel rows.

A photosensitive device 26 is mounted towards the base 28 of the column. The device may be of th retroreflective type and detects the presence of a coil strip 12. A second column 30 having a conveyor assembly 32 mounted thereto is positioned near the accumulator bin 18. As the pocketed coils emerge from the manufacturing apparatus, the strip 12 forms a loop 12' between it and the first column 20. The photosensitive device 26 is operatively connected with the conveyor assembly 32 to cause its actuation when the loop 12' extends below a present point with respect to the first column. The present point corresponds to the position of the photosensitive device.

Figure 2:
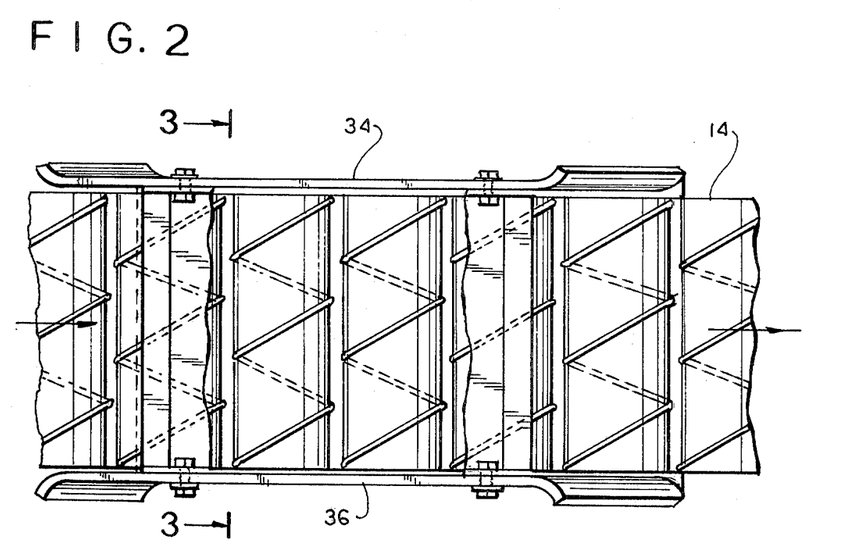
FIG. 2 is a top view of a guide chute assembly taken along the plane of line 2—2 in FIG. 1.
Figure 3:
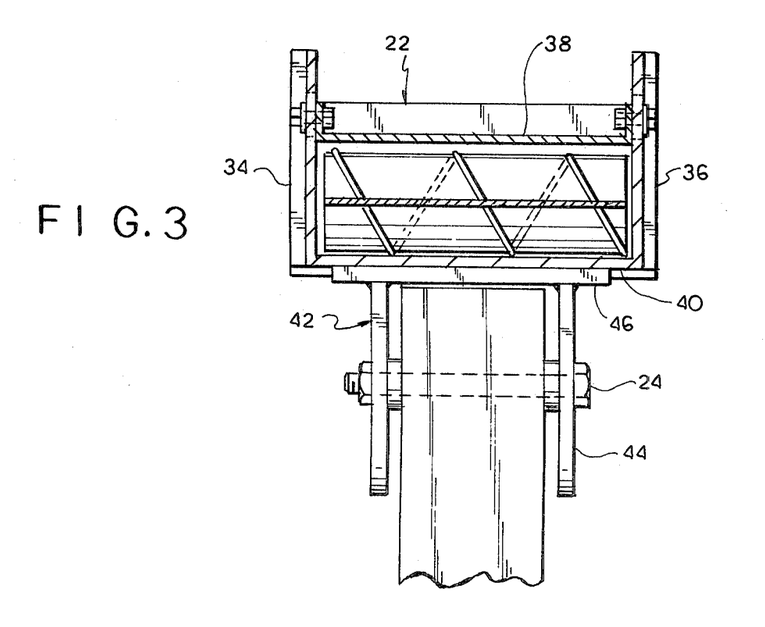
FIG. 3 is a partially sectional view of the guide chute of FIG. 2 taken along the planes of line 3—3.

The portion of the strip 12 extending between the guide chute 22 and conveyor assembly 32 is maintained at a sufficient height to allow a person of normal height to easily pass beneath. As shown in FIGS. 2 and 3, the chute 22 includes parallel side walls 34, 36 and top and bottom walls 38, 40. The pivot bolt 24 extends through a mounting bracket 42 having flat parallel walls 44 extending down from a chute mounting plate 46.

Figure 4:
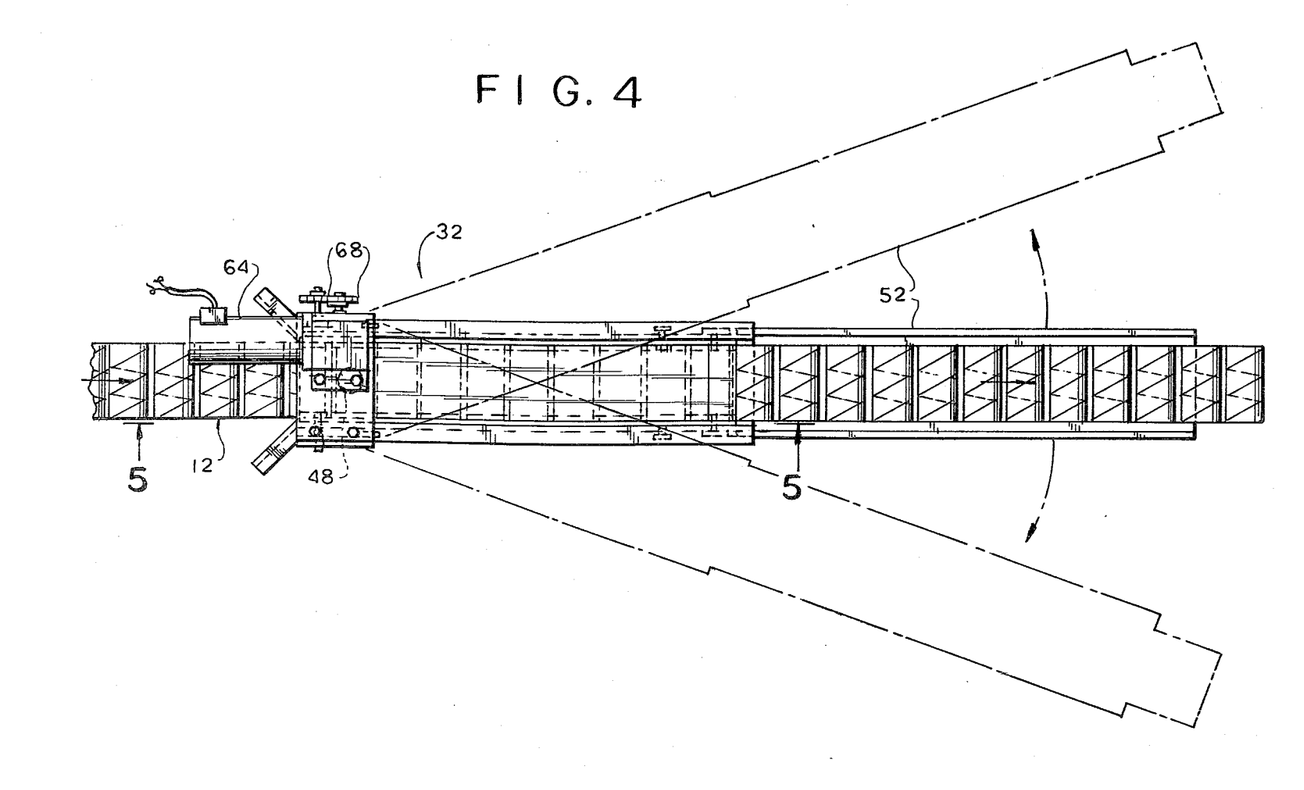
FIG. 4 is a top view of an infeed conveyor assembly and chute taken along the plane of line 4—4 in FIG. 1.
Figure 5:
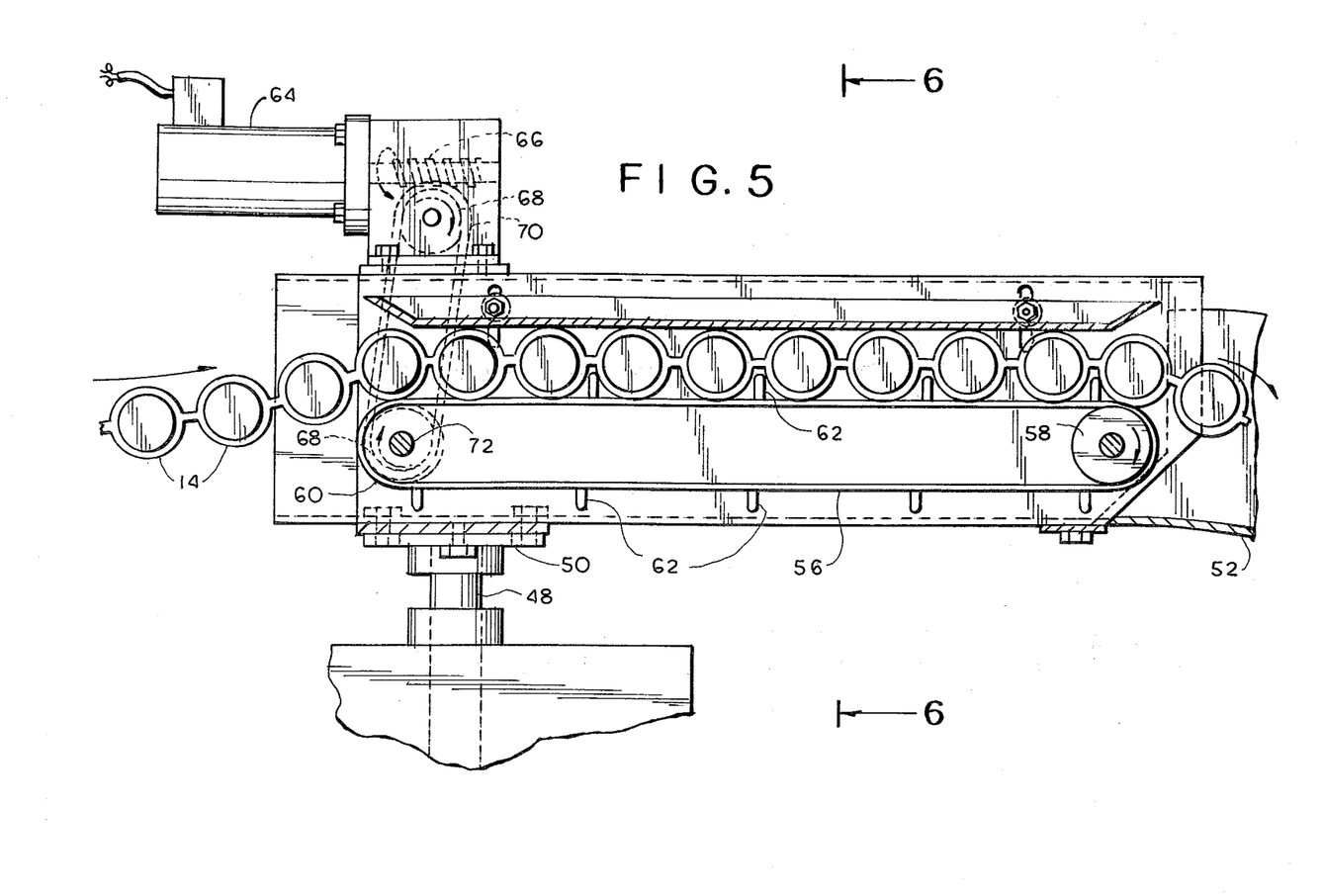
FIG. 5 is a partially sectional view of the conveyor assembly and chute taken along the plane of line 5—5 of FIG. 4.
Figure 6:
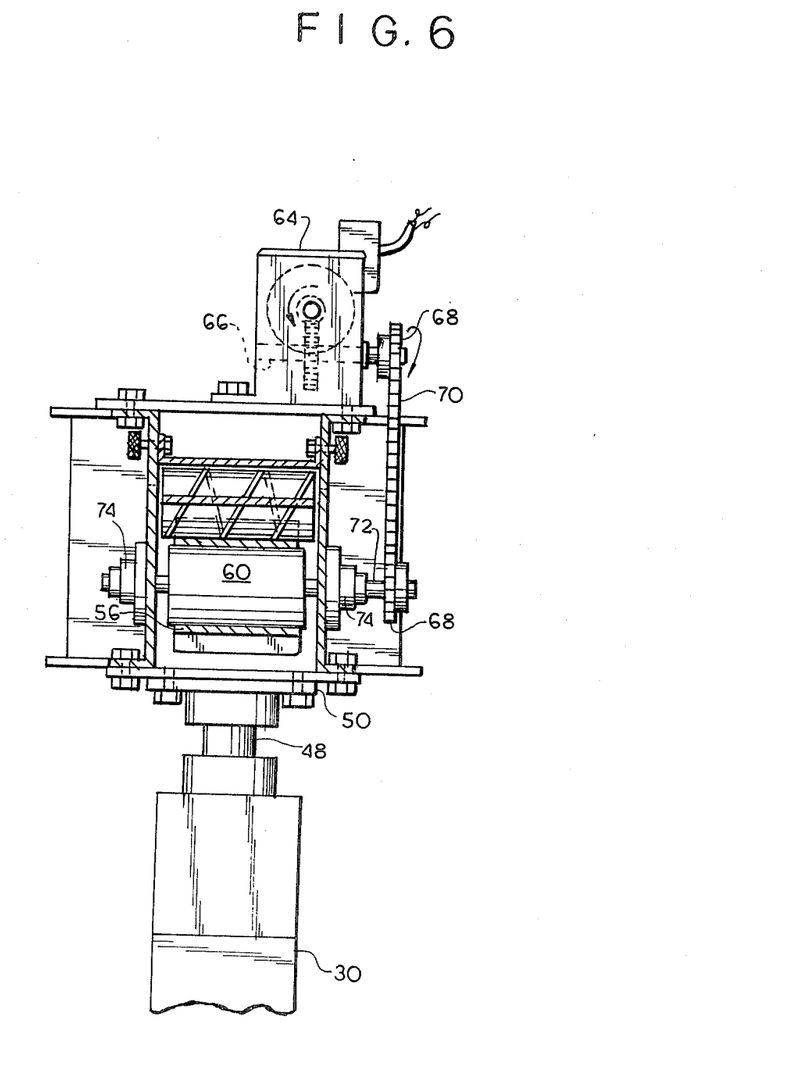
FIG. 6 is a partially sectional view taken along the plane of line 6—6 of FIG. 5.

The conveyor assembly 32 is shown in detail in FIGS. 4-6. It is mounted to the second column 30 by means of a pivot shaft 48 and mounting bracket 50. The assembly 32 may oscillate back and forth about the axis of the pivot shaft 48 as shown in phantom in FIG. 4. A discharge chute 52 is secured to the conveyor assembly for guiding the strip 12 proceeding therethrough. If desired, the discharge chute 52 may be pivotally mounted so that it alone may oscillate rather than together with the conveyor.

Figure 9:
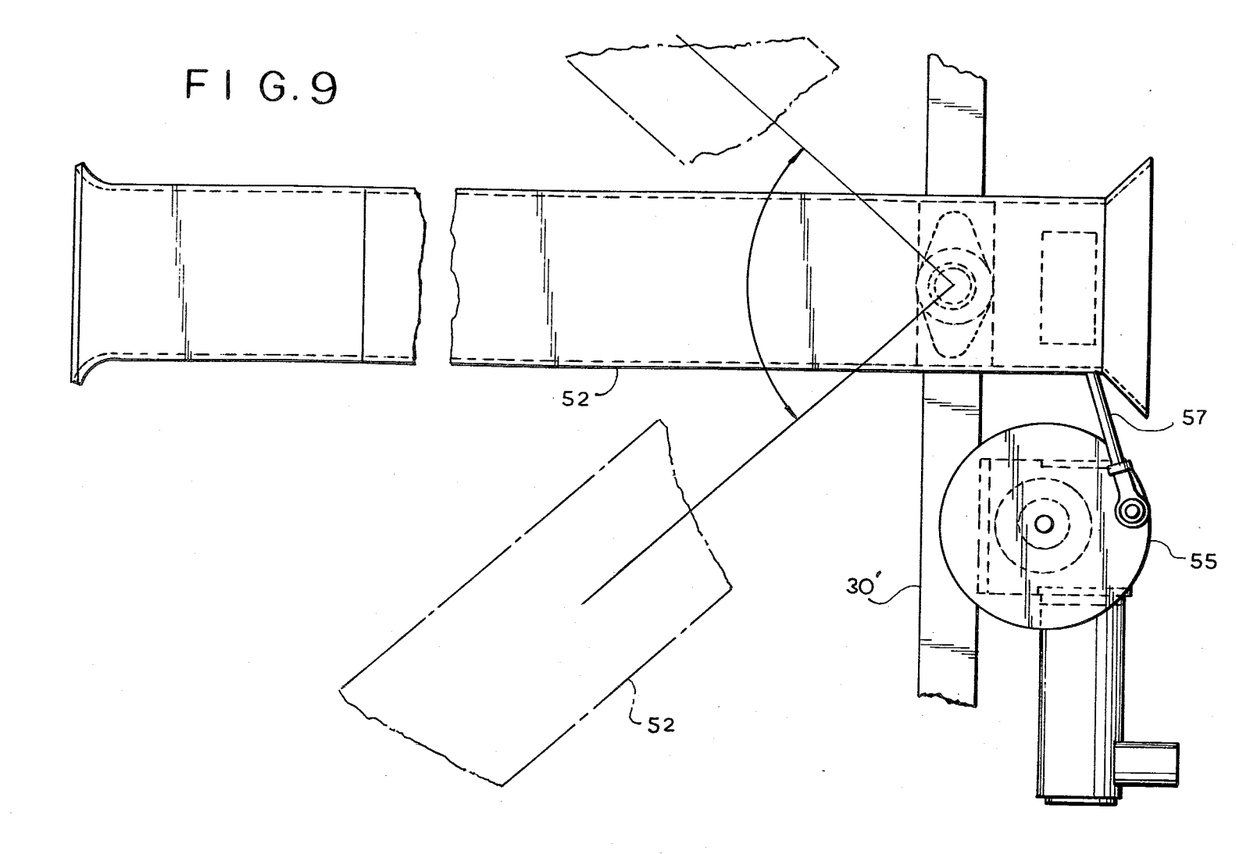
FIG. 9 is a plan view of a discharge chute according to one embodiment of the invention.
Figure 10:
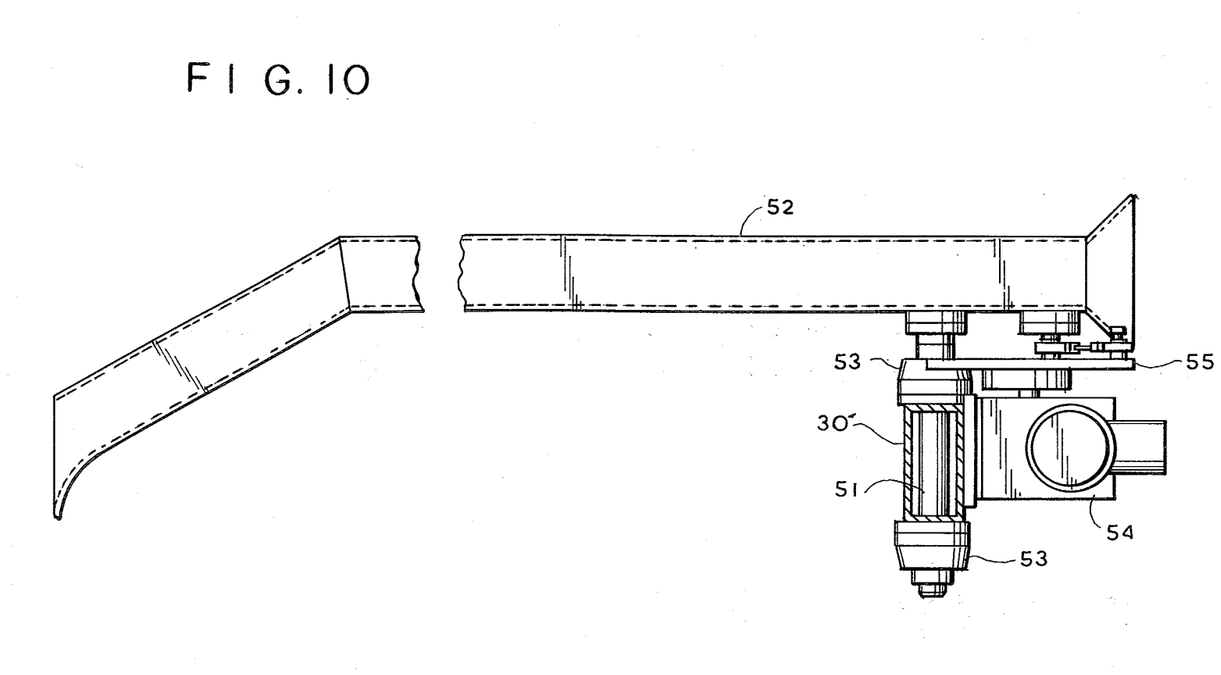
FIG. 10 is a partially sectional elevation view thereof.

FIGS. 9 and 10 show an arrangement where only the discharge chute 52 is mounted separately from the conveyor assembly 32. A length of rectangular tubing 30', may be mounted independently or to the second column 30. A pivot shaft 51 extends through the tubing 30' and a pair of flange bearings 53. The chute 52 is mounted to the pivot shaft 51 for oscillation about the axis thereof.

A gearmotor 54 is mounted to the tubing 30' and drives a crank disc 55. A connecting rod 57 is pivotably mounted between the crank disc 55 and the chute 52. Upon rotation of the crank disc, the chute is caused to oscillate back and forth along an arc to feed a strip of pocketed coils to the accumulator bin 18.

The conveyor assembly 32 includes a belt 56 mounted upon a pair of drums 58, 60. Means (not shown) are provided for setting the distance between the drums to adjust the tension of the belt 56. A plurality of pads 62 are screwed on to the belt for preventing slippage of the strip 12 of pocketed coils transported thereby.

A motor 64 is provided for driving one 60 of the drums by means of a worm wheel 66, sprockets 68, and belt 70. The drum 60 is mounted upon a shaft 72 supported by a pair of flange bearings 74.

A third column 76 having a second conveyor assembly 78 mounted thereon is provided near the end of the bin opposite from the first conveyor assembly 32. Both conveyor assemblies have substantially identical constructions. The second assembly accordingly is not described in detail herein. Oscillating means are unnecessary at the second assembly as the strip 12 emerging therefrom is to be immediately assembled upon a rack (not shown) into a desired form. Adjacent pockets are either sewn or otherwise connected together on the rack.

A second retroreflective photosensitive device 80 is mounte near the bottom of the third column 76. The second conveyor is actuated when the device fails to detect the presence of a strip. If the pocketed coils are manually assembled upon a rack, the operator will grasp a portion of the strip 12 causing a loop to form between him and the conveyor assembly. When a length of strip is mounted to the rack, the loop becomes smaller. The failure of the loop to extend below the photosensitive device causes the actuation of the second conveyor assembly. An additional length of pocketed coils is withdrawn from the accumulator bin 18 so that the operator always has a sufficient length of strip to work with.

If the strip 12 is to be assembled automatically upon a rack or other structure, it may be desirable to attach a discharge chute 82 to the second conveyor assembly 78. A loop 12" will then form between the chute and the rack. The loop is maintained at a substantially constant size by means of the second photosensitive device 80 and conveyor assembly 78.

Figure 7:
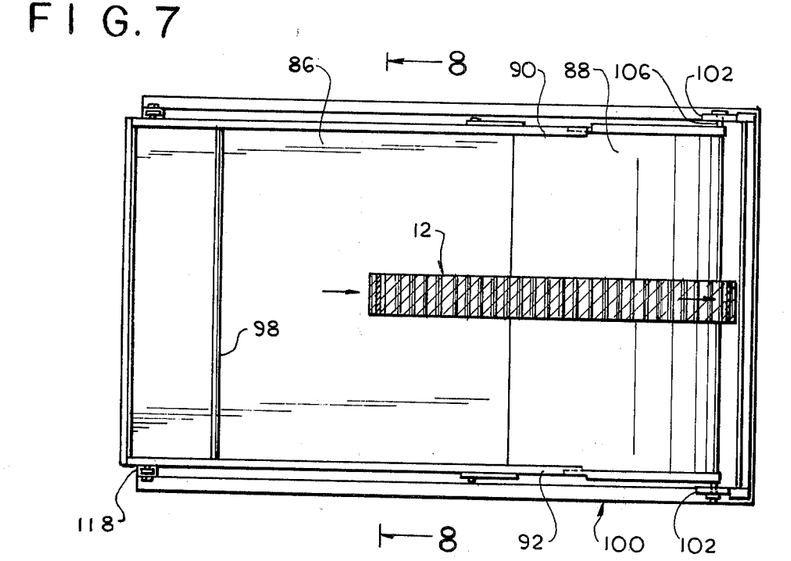
FIG. 7 is a top view of an accumulator bin taken along lines 7—7 of FIG. 1.
Figure 8:
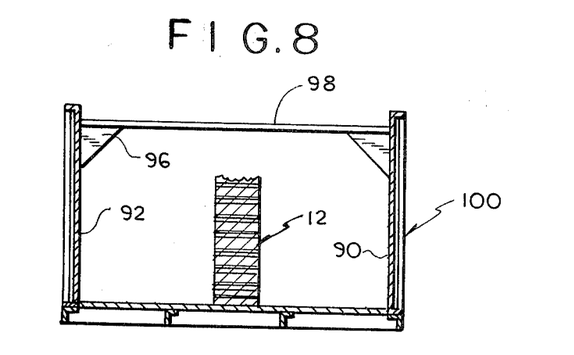
FIG. 8 is a sectional view of the accumulator bin taken along the plane of line 8—8 in FIG. 7.

The accumulator bin 18 is specifically constructed for handling a strip of pocketed coils which is substantially continuously introduced thereto. It includes a chute weldment 84 comprising a straight portion 86 and an arcuate portion 88. To facilitate construction, the straight and arcuate portions may be separate pieces. The bin also includes a pair of side walls 94, 96 and connected by a cross tie 98 at their upper ends. The bottom portions of the side walls are flanged and are attached to the chute weldment 84 by bolts. The side walls may also be made from a plurality of elements which are clamped or otherwise secured to each other.

The bin 18 is mounted to a frame 100. The frame includes a pair of flanges 102 having slots 104 therein to which one end of the bin is pivotably mounted. Lateral stub shafts 106 extend from the top of the arcuate portion 88 of the bin into the respective slots 104.

The opposite end of the bin is mounted to a pair of support weldments 108 each having a plurality of holes 110 therein. A lateral bar 112 extends between the weldments 108 to support the bin 18. The height of the bar 112 may be adjusted by sliding the support weldments up or down the vertical frame bars 114 to which they are attached. Once the holes 110, 116 in the support weldments and the frame bars 114 are aligned, connector pins may be inserted therethrough to maintain the height of the bar 112 and the desired angle of inclination of the bin 18. In the embodiment shown and described herein, the straight portion 86 of the chute weldment 84 extends at about a 30° angle from the horizontal. Different angles may be set depending upon the pocket material employed and the surface structure of the chute weldment.

The frame 100 may be mounted upon rollers 118 to facilitate transporting it to a work site. The rollers are also useful in adjusting the position of the bin 18 with respect to the second and third columns 30, 76.

In operation, pocketed coil springs are substantially continuously manufactured by apparatus 16 and emerge therefrom as a strip 12. The strip 12 forms a loop 12' between the apparatus 16 and the chute 22 mounted on the first column. When the loop 12' becomes large enough to be detected by the first photosensitive device 26, the first conveyor assembly is actuated to feed the strip 12 into the accumulator bin 18.

The accumulator bin 18 is oriented within its frame 100 such that gravity tends to draw the strip 12 down the straight portion 86 of the chute weldment 84 towards the arcuate portion 88 thereof. The conveyor assembly 32 together with its attached chute 52 oscillates back and forth along the arc as the strip 12 is conveyed. This insures that it is deposited evenly over substantially the entire width of the accumulator bin. As additional pocketed coils are fed by the conveyor assembly 32, the strip works its way down the straight chute surface 86. Both gravity and the pressure exerted by additional pocketed coils urge the earlier introduced strip portion in the desired direction. The first manufactured pocketed coils accordingly will be found towards the front of the bin 18 as they are urged about the arcuate portion 88 thereof.

Pocketed coils are removed from the bin 18 as required by the operator or a further processing machine. The second conveyor assembly 78 is actuated when the second photosensitive device 80 detects the absence of a portion of the strip 12. This corresponds to an indication that additional pocketed coils are required, and the conveyor assembly 78 is accordingly instructed to supply them. In an automatic operation where a length of strip is removed from the bin 18 and processed into a desired configuration in a continuous manner, a second loop 12" is formed between the conveyor assembly 78 and the processing apparatus (not shown). When a length of strip is pulled from the loop 12", a corresponding length is added by means of the conveyor assembly to restore it to its original size. There is always a sufficient amount of material ready for processing.

Due to the fact that the first manufactured coils are always towards the front (i.e. arcuate) portion of the accumulator bin 18, the risk of tangling the strip is greatly reduced. This facilitates both automatic and manual operations when the pocketed coils are utilized.

What is claimed is:

1. An assembly for handling a strip of pocketed spring coils, comprising:
   an accumulator bin, said bin including side walls and a bottom surface adjoining said side walls, said bottom surface including a substantially flat surface and an adjoining arcuate surface at one end thereof;
   supporting means supporting said accumulator bin such that said flat bottom surface is oriented at an incline with respect to a horizontal plane, whereby material introduced to said flat bottom surface will be urged by gravity towards said adjoining arcuate surface;
   feed means for feeding a strip of pocketed coils onto said flat bottom surface of said accumulator bin; and
   means for oscillating said feed means such that a strip of pocketed coils may be fed substantially evenly upon said flat bottom surface with respect to said adjoining side walls.

2. An assembly as defined in claim 1 including means for removing a strip of pocketed coils from said accumulator bin.

3. An assembly as defined in claim 2 wherein said removing means includes a conveyor.

4. An assembly as defined in claim 3 including a discharge chute leading from said conveyor for guiding a strip of pocketed coils.

5. An assembly as defined in claim 2 or 3 including photosensitive means for detecting a strip of pocketed coils as it emerges from said conveyor, said conveyor being actuable when said photosensitive means fails to detect the presence of said strip.

6. An assembly as defined in claim 5 including:
   means for producing strips of pocketed coils; and
   second photosensitive means positioned between said producing means and said feed means, said feed means being actuable upon the detection of a strip of pocketed coils by said second photosensitive means so as to introduce a portion of said strip to said accumulator bin.

7. An assembly as defined in claim 1 including:
   means for producing strips of pocketed coils; and
   photosensitive means positioned between said producing means and said feed means, said feed means being actuable upon the detection of a strip of pocketed coils by said photosensitive means so as to introduce a portion of said strip to said accumulator bin.

8. An assembly as defined in claim 1 wherein said flat bottom surface is oriented at about a 30° angle from the horizontal plane.

9. An assembly as defined in claim 1 including a strip of pocketed coils within said feed means and extending from said feed means into said accumulator bin.

10. An assembly as defined in claim 7 wherein said producing means and said feed means are positioned a selected distance apart such that a strip of pocketed coils produced by said producing means will form a loop therebetween, said photosensitive means positioned for detecting the presence or absence of such a loop.

11. An assembly as defined in claim 7 including a column positioned between said producing means and said feed means, said column including a guide chute mounted thereon for receiving a strip of pocketed coils from said producing means, said photosensitive means positioned for detecting a loop of pocketed coils formed between said producing means and said guide chute.

12. An assembly as defined in claim 2 or 3 wherein said removing means is mounted to a column, said column including photosensitive means mounted thereon, said removing means being actuable when said photosensitive means fails to detect the presence of a strip of pocketed coils.

13. An assembly as defined in claim 1, 2 or 3 wherein said supporting means is a frame, said accumulator bin being pivotably mounted to said frame, said frame including means for adjusting the angle of incline of said accumulator bin with respect thereto.

14. An assembly as defined in claim 13 including wheels mounted to said frame.

15. An assembly as defined in claim 1 including a strip of pocketed coils extending from said feed means into said accumulator bin.

16. An assembly as defined in claim 1 including:
   means for producing a strip of coils;
   a column positioned between said producing means and said feed means;
   a guide chute mounted to said column;
   first photosensitive means positioned for detecting a loop of pocketed coils formed between said producing means and guide chute, said feed means being actuable upon the detection of said loop of pocketed coils;
   means for removing a strip of pocketed coils from said accumulator bin;
   second photosensitive means positioned for detecting a strip of pocketed coils after it emerges from said removing means, said removing means being actuable when said second photosensiive means fails to detect the presence of a strip.

17. A method for handling a strip of pocketed coils comprising the steps of:
   providing a strip of pocketed coils;
   providing an accumulator bin, said bin having an inclined surface in its lengthwise direction and side walls defining the width of said inclined surface, said width being greater than the width of said strip;
   introducing a first portion of said strip to said inclined surface substantially across the width thereof; and
   introducing additional portions of said strip substantially across the width of said inclined surface such that said additional portions and gravity move said first strip portion down said inclined surface.

18. A method as defined in claim 17 wherein said accumulator bin includes an arcuate surface adjoining said inclined surface, including the step of causing said first strip portion to move about at least part of said arcuate surface.

19. A method as defined in claim 17 including the steps of forming a loop is said strip outside said accumulator bin and introducing said first portion of said strip into said accumulator bin only when said loop exceeds a predetermine size.

20. A method as defined in claim 17, 18 or 19 including the steps of providing detecting means outside said accumulator bin; and removing said first portion of said strip from said accumulator bin only when said detecting means fails to detect a portion of a strip adjacent thereto.

* * * * *